(12) United States Patent
Cutitta, II

(10) Patent No.: US 7,962,284 B2
(45) Date of Patent: Jun. 14, 2011

(54) DEVICE, METHOD AND MEDIUM PROVIDING CUSTOMIZED AUDIO TOURS

(76) Inventor: David Cutitta, II, Bethesda, MD (US)

(*) Notice: Subject to any disclaimer, the term of this patent is extended or adjusted under 35 U.S.C. 154(b) by 765 days.

(21) Appl. No.: 11/976,930

(22) Filed: Oct. 30, 2007

(65) Prior Publication Data

US 2009/0112466 A1 Apr. 30, 2009

(51) Int. Cl.
*H04W 4/02* (2009.01)
*H04M 3/42* (2006.01)

(52) U.S. Cl. ............ 701/211; 701/207; 455/456.1; 455/456.3; 455/412.1; 455/414.1; 340/539.11; 340/990; 434/153

(58) Field of Classification Search ............ 701/211; 709/209; 725/60; 434/116
See application file for complete search history.

(56) References Cited

U.S. PATENT DOCUMENTS

| | | | | |
|---|---|---|---|---|
| 5,767,795 | A * | 6/1998 | Schaphorst | 340/988 |
| 5,889,473 | A * | 3/1999 | Wicks | 340/7.21 |
| 6,023,241 | A * | 2/2000 | Clapper | 342/357.13 |
| 6,199,045 | B1 * | 3/2001 | Giniger et al. | 705/1.1 |
| 6,266,614 | B1 * | 7/2001 | Alumbaugh | 701/211 |
| 6,401,032 | B1 * | 6/2002 | Jamison et al. | 701/207 |
| 7,130,759 | B2 * | 10/2006 | Willins et al. | 702/150 |
| 7,224,967 | B2 * | 5/2007 | Hale et al. | 455/422.1 |
| 7,240,108 | B2 * | 7/2007 | Smith et al. | 709/223 |
| 7,558,526 | B2 * | 7/2009 | Guo | 455/3.06 |
| 2002/0111154 | A1 * | 8/2002 | Eldering et al. | 455/414 |
| 2002/0183072 | A1 * | 12/2002 | Steinbach et al. | 455/456 |
| 2003/0104824 | A1 * | 6/2003 | Hale et al. | 455/456 |
| 2005/0192025 | A1 * | 9/2005 | Kaplan | 455/456.1 |
| 2007/0001875 | A1 * | 1/2007 | Taylor | 340/995.24 |
| 2008/0005225 | A1 * | 1/2008 | Ferguson et al. | 709/203 |
| 2008/0140382 | A1 * | 6/2008 | Jones et al. | 704/2 |
| 2008/0183385 | A1 * | 7/2008 | Horn | 701/213 |
| 2008/0319773 | A1 * | 12/2008 | Wong et al. | 705/1 |

OTHER PUBLICATIONS

Broadbent, J. and Marti, P.;"Location aware mobile interactive guides: usability issues", Proc. Inter. Cultural Heritage Informatics Mtg, Oaris France, 1997, pp. 9-12.*
Kramer, R., Modsching, M., Schultz, J. and ten Hagen, K; "Context-Aware Adaptation in a Mobile Tour Guide:" Springer 210-224, 2005.*
Gilden, j. LA Times ,"Audio Tours on iPod That Could be Music to a Tourist's ears", Jul. 24, 2005, Retrieved from latimes.com.*

* cited by examiner

*Primary Examiner* — Thomas G Black
*Assistant Examiner* — Lin B Olsen

(57) ABSTRACT

The present invention relates to a method, medium and portable device for providing customized audio tours. The portable device includes a display displaying a map, a user input module allowing a user to select a particular point of the map displayed on the display, and a playback module playing a stored audio file corresponding to the particular point of the map selected by the user, the audio file including custom information regarding an area of the map corresponding to the particular point selected.

20 Claims, 5 Drawing Sheets

DEVICE, METHOD AND MEDIUM PROVIDING CUSTOMIZED AUDIO TOURS

BACKGROUND

1. Field

One or more embodiments of the present invention relate to providing customized audio tours, and more particularly, to a method and portable electronic device providing customized audio tours.

2. Description of the Related Art

Tour guides have provided customized tours of famous places such as cities for centuries. Such tours were traditionally provided by a guide who led a group on foot and described landmarks such as buildings and monuments along the guided path.

More recently, vehicles such as buses provide audio narrative describing the landscape as the bus proceeds along a predetermined route of interest to the client tourist. However, such tours, in order to remain economically priced, are typically general interest tours and fail to represent the particular interests of the client. For example, a bus touring Washington D.C. may have a tourguide who explains the history of Union Station as the bus passes the building. The tourguide may also briefly describe the architectural style of the building and quote a statistic citing the number of passengers using the station for train travel on a given day. However, time limitations and the desire to provide information of interest only to the majority of clients severely limits the amount of specialized information that may be provided.

For example, on a particular bus tour of Washington D.C., there may be clients on board with in-depth knowledge of the history of the city. Such history-oriented clients may be particularly interested in highly detailed historical accounts. When reaching Union Station, the history-oriented clients may be interested in the names of the original financers of the building and the impact of World War II on the building's use. In contrast, the bus may also contain clients who are railroad buffs and who would prefer a detailed description of Union Station's use as a railroad station including information regarding railroads serving the station, the number of trains arriving per hour, etc. Finally, a third group of clients may be architecture students who desire information regarding the building itself such as the building materials used, the individual who designed the building and architectural influences. Many other groups of individuals may also be on board, each of whom may have one or more highly specialized interests and backgrounds that would motivate the individuals to select a customized tour over a generalized tour. None of the needs of such individuals are adequately met by a generalized tour that attempts to appeal to the common denominator.

At the same time, portable electronic devices have become ubiquitous. As their presence has increased, new uses have been conceived for the devices. For example, museums now offer tours in which wireless transmitters provide specialized content to a wireless receiver located within a predetermined area. Alternatively, museums may offer the specialized content as a downloadable audio file that may be played by a portable audio device such as an Ipod®. However, although the content is specialized, it is still not customized to the specialized interests of a particular client. Further, the user is limited in his ability to select and control the output of the tour to correspond to a particular geographic location.

SUMMARY

One or more embodiments of the present invention provide a portable electronic device capable of providing audio files including one or more customized audio tours corresponding to a particular geographic location that may be selected by a user.

One or more embodiments of the present invention provide a method of automatically playing back audio files including one or more customized audio tours corresponding to a particular geographic location selected by a user.

One or more embodiments of the present invention provide a computer readable medium including a method of automatically playing back audio files including one or more customized audio tours corresponding to a particular geographic location selected by a user.

Additional aspects and/or advantages will be set forth in part in the description which follows and, in part, will be apparent from the description, or may be learned by practice of the invention.

To achieve at least the above and/or other aspects and advantages, embodiments of the present invention include a portable electronic device providing customized audio tours, The device includes a display displaying a map, a user input module allowing a user to select a particular point of the map displayed on the display, and a playback module playing a stored audio file corresponding to the particular point of the map selected by the user, the audio file including custom information regarding an area of the map corresponding to the particular point selected.

To achieve at least the above and/or other aspects and advantages, embodiments of the present invention include a method of providing customized audio tours. The method includes displaying a map, receiving a particular point of the displayed map as an input according to a user selection, and playing back a stored audio file corresponding to the particular point of the map selected by the user, the audio file including custom information regarding an area of the map corresponding to the particular point selected.

To achieve at least the above and/or other aspects and advantages, embodiments of the present invention include a portable electronic device providing customized audio tours, The device includes a position identification module detecting a location of a user carrying the portable electronic device, a tracking module associating the detected location of the user with one of a plurality of predetermined locations, a memory storing one or more audio files, each of the audio files being associated with one of the plurality of predetermined locations, and the each of the audio files having particular information of interest to the user regarding the associated predetermined location, and a playback module automatically playing back an audio file associated with a predetermined location when the tracking module associates the detected location of the user with the predetermined location.

To achieve at least the above and/or other aspects and advantages, embodiments of the present invention include a portable electronic device providing customized audio tours, The device includes a position identification module detecting a location of a user carrying the portable electronic device, a display displaying a map of an area including the detected position of the user, a user input module allowing the user to select a particular point of the map displayed on the display, a memory storing a plurality of audio files, each file having information of interest to the user related to a point located within the area found on the map, and a playback module playing back a stored audio file corresponding to the particular point of the map selected by the user, the audio file including information of interest to the user related to the particular point of the map selected.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
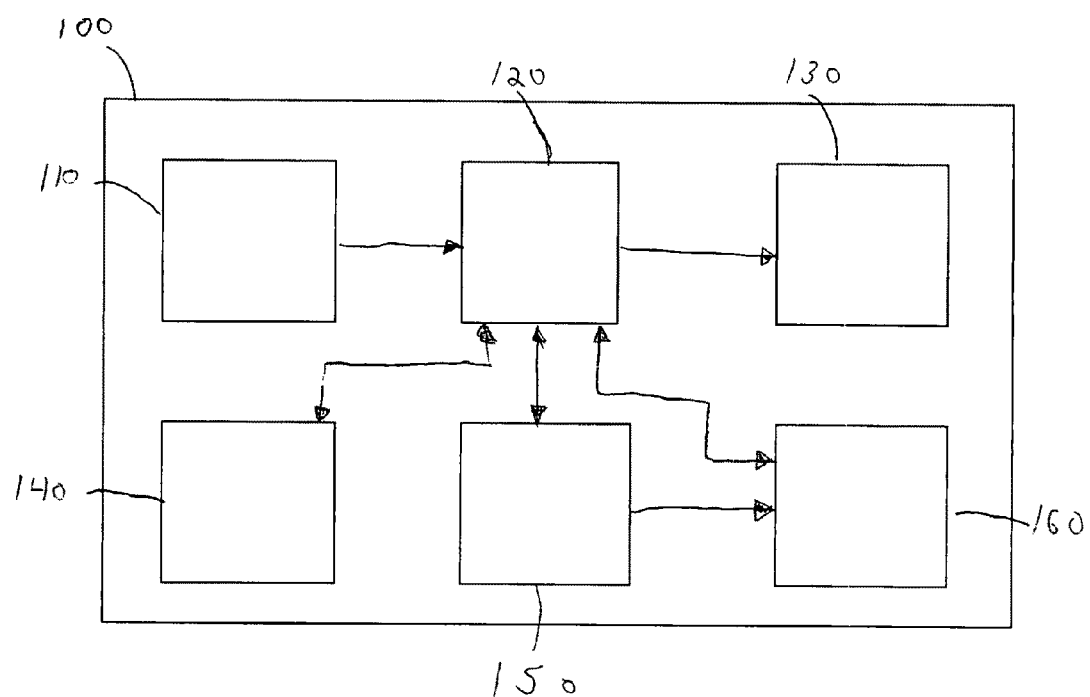
FIG. 1 is a block diagram illustrating a portable electronic device providing customized tours, according to an embodiment of the present invention.

Reference will now be made in detail to embodiments, examples of which are illustrated in the accompanying drawings, wherein like reference numerals refer to the like elements throughout. Embodiments are described below to explain the present invention by referring to the figures.

FIG. 1 is a block diagram showing a portable electronic device providing customized tours 100 (hereinafter, custom tour guide device 100), according to an embodiment of the present invention. The custom tour guide device 100 shown in FIG. 1 may include, for example, a position identification module 110, a processor 120, display 130, a memory 140, a user input module 150 and a playback module 160. The custom tour guide device 100 may be a customized device, or may be a combination of hardware and software that may be installed in an existing device such as a mobile phone, a portable data assistant (PDA), a digital music player, or any other portable electronic device such as an Apple® Ipod™ or Apple® Iphone™, for example.

The custom tour guide device 100 will be described in more detail with reference to FIGS. 1 and 2. Embodiments of the custom tour guide device 100 are described herein with or without the position identification module 110. If the custom tour guide device 100 lacks a position identification module 110, e.g., lacks a global positioning system (gps) receiver, the user may manually pull up a map of a particular location to the display, for example by entering a street address, a reference point, a milestone or other known coordinates.

If the custom tour guide device 100 includes the position identification module 110, it may be embedded in the device or may be included in a separate device. In an embodiment, a gps receiver is used to locate the position of the user; however the position identification module 110 may equally use any other position identification devices or techniques. When using the gps receiver, the receiver receives a satellite signal broadcast by two or more satellites, and is able to accurately calculate the location of the device and the user, using the received and processed gps signal, e.g., by triangulation. The position identification module 110 provides detailed coordinates of the user's location to the processor 120, in order to accurately represent the location on the display 130, e.g., on a displayed map.

The processor 120 may be a central processing module or any other type of processing apparatus. The processor acts as a controller to coordinate the various functions of the custom tour guide device 100, and may act substantially similar to the operation of a central processing unit in a computer, for example.

The display 130 is typically a high resolution display, internal or external to the custom tour guide device 100, although any type of electronic display may be used. The display may include an embedded array of sensors allowing a user to select one or more particular points displayed on the display. The selection of a point may be accomplished using a pointing device such as a wand or stylus having a relatively sharp tip or, the point may be selected using a finger of the user, as with a touch screen display.

The memory 140 is typically embedded in the custom tour guide device 100. The memory may be any type of memory but is typically a non-volatile memory including, for example, a magnetic hard drive, memory stick or flash memory. The memory 140 may include all of the maps needed for display on display 130. The maps may be of a neighborhood, a city, a county, a region, a country or of the entire world. Multiple maps of differing scales and locations may also be stored. The memory 140 may also include a plurality of audio files, stored for example in mp3 format, although wave or any other audio format may be used. Each of the stored audio files contains audio having a custom audio tour including information of interest to the user corresponding to a predetermined location. The audio files may be categorized in memory according to one or more themes. For example, a particular user may have an interest in architecture or history. Based on this interest, multiple, independent custom audio tours may be downloaded, each having information related to the themes of interest to the user and each having information corresponding to a plurality of predetermined locations that may be displayed on a map. The downloaded audio tours may be purchased from a vendor and stored in memory 140 similar to the way audio music files are purchased and stored, for example. The custom audio tour information will be described in greater detail below.

The user input module 150 accepts and processes commands from the user, allowing the user to select one or more particular points from the map shown on the display. Each particular point on the display may include one or more corresponding audio files having information of interest to the user. The user input module 150 may also prompt the user with a menu, allowing the user to preselect an audio tour having a particular theme, from among the themes stored in the memory 140. The user input module 150 may receive input from the user in various ways including, for example, from a touch-pad, trac-ball or touch-sensitive screen.

The playback module 160, may receive a point from the user input module 150, corresponding to a particular point selected by the user from the map shown on the display. The playback module 160 may then select and begin playback of an audio file associated with the point selected by the user. The audio playback may be performed similar to the playback of any digital audio file, such as that performed by an Ipod™ or other digital audio player, for example.

Figure 2:
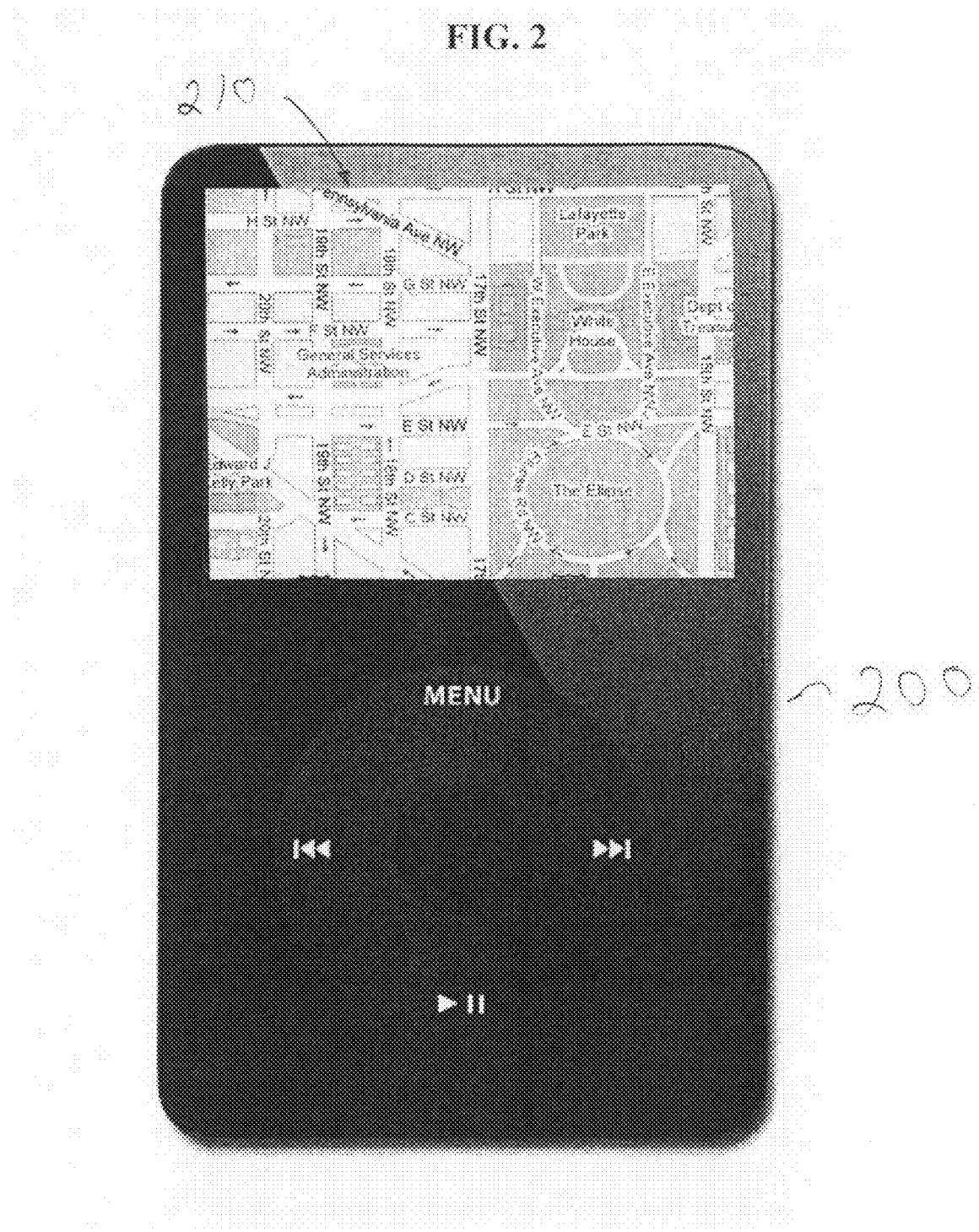
FIG. 2 illustrates an example of portable electronic device having a display, according to an embodiment of the present invention.

Referring to FIG. 2, an example is provided in which a group of tourists is led on a walking tour of Washington D.C. Each of the tourists has diverse interests. A first user has preselected a theme of civil war history while touring Washington D.C. As the first user walks by the Old Patent Office, the user uses a pointing device to select a point corresponding to the location of the Old Patent Office on a map 210 displayed on a portable device 200 carried by the user. Referring back to FIG. 1, the processor 120 in the device 200 may receive the selected point from user input module 150 and select a corresponding audio file saved in memory 140. The playback module 160 of the device then plays a detailed audio account describing the use of the old Patent Office as a hospital during the civil war. At the same time a second user on the same tour has preselected a theme of architecture. As the second user walks by the Old Patent Office, the user selects a point corresponding to the location of the Old Patent Office on a map displayed on a second portable device 200. The device then plays a detailed audio account describing the architectural style of the Old Patent Office as Greek Revival, and recounting interesting facts about the original architect.

Figure 3:
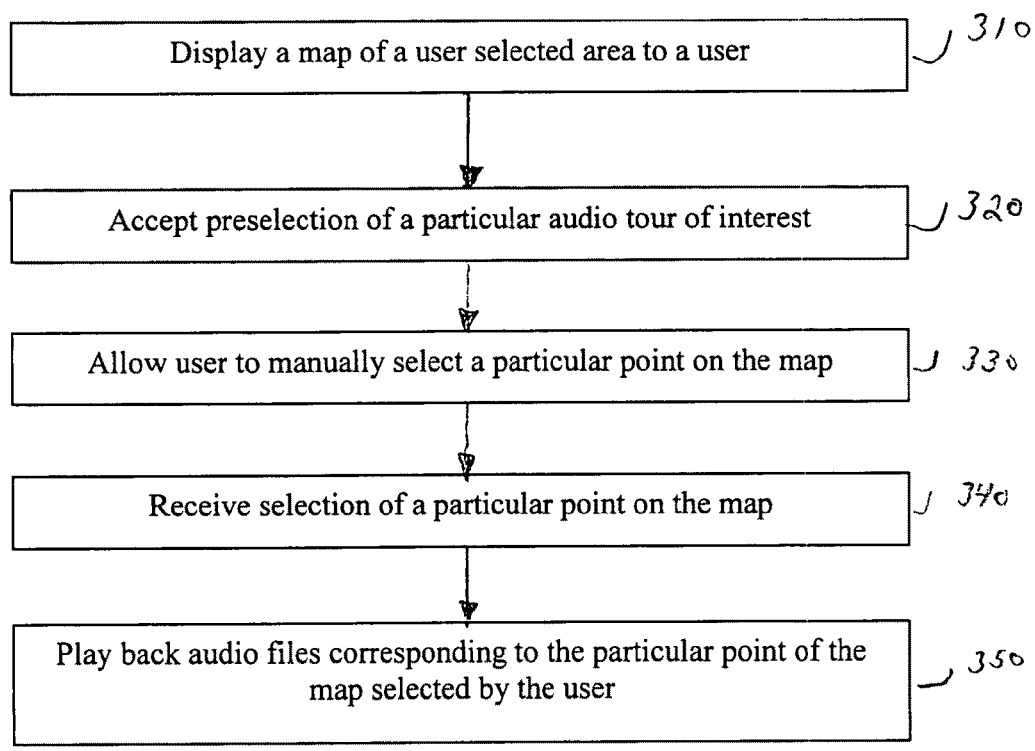
FIG. 3 illustrates a method of providing customized tours, according to an embodiment of the present invention.

FIG. 3 illustrates a method of providing customized tours, according to an embodiment of the present invention.

In operation 310, a map of a user selected area is displayed to a user, e.g., on an electronic display of a portable device. The area displayed by the map may be manually selected by the user, e.g., by scrolling or zooming in on a map of a large area saved in memory. Alternatively, the user may enter a physical address, a landmark name or other coordinates. The map area may also be displayed automatically using a position identification device such as a gps receiver to track a location of the user and to display an area immediately surrounding the location of the user.

In operation 320, the user may manually preselect a particular theme of interest to the user using, e.g., a user input module and a wand, or by touching the screen. An audio tour corresponding to the selected theme is typically pre-stored in memory and includes a plurality of audio files corresponding to a variety of locations on the map. The audio tour is generally oriented toward a topic of interest to the user. For example, on a walking tour of Washington D.C., a first user may be interested in detailed information regarding the architecture encountered on her tour. A second user may be interested in learning about historically significant events that occurred around the tour area. A third user may prefer learning about historical figures or celebrities who lived in the area during a particular historical period, and a fourth user might prefer information regarding the natural geography encountered in the area. A fifth user might be interested in having one or more specialized tours saved, and hearing some or all of the audio data from the tours consecutively for one or more points selected on the tour.

In operation 330, the user may manually select a particular point on the map, e.g., using a wand or by touching the screen. By selecting the particular point, the user indicates his or her interest in hearing a portion of a preselected custom audio tour corresponding to the selected point. For example, the selected point may correspond to a location on the map such as a building or an intersection.

In operation 340, a particular point of the displayed map may be received as an input according to the user selection.

In operation 350, one or more audio files corresponding to the particular point of the map selected by the user may be played back to the user. The audio files typically include customized tour information relating to a theme preselected by the user, e.g., architecture, and corresponding to the point selected by the user. For example, when the user selects a point corresponding to the location of the Old Patent Office on a map of Washington D.C., an audio file is played recounting interesting facts about the architectural style and history of the Old Patent Office.

Figure 4:
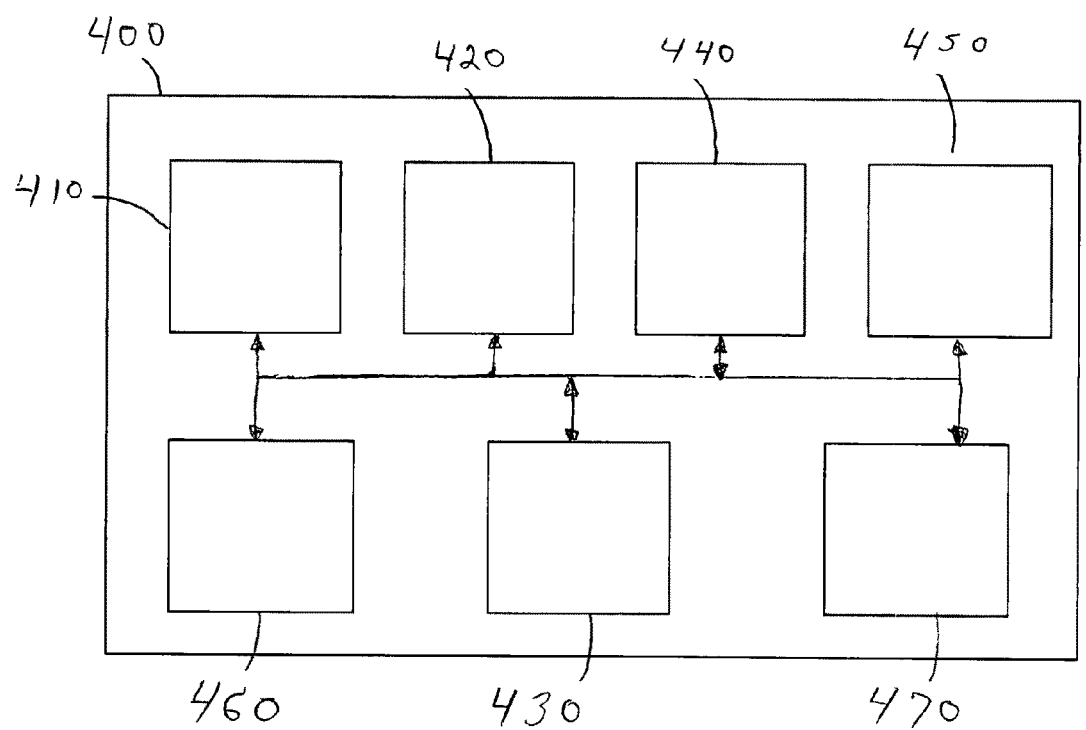
FIG. 4 is a block diagram illustrating a portable electronic device automatically providing customized tours based on a current location of a user, according to an embodiment of the present invention.

FIG. 4 is a block diagram showing a custom tour guide device 400, according to another embodiment of the present invention. The custom tour guide device 400 in FIG. 4 may include, for example, a position identification module 410, a processor 420, display 430, a memory 440, a user input module 450, a tracking module 460 and a playback module 470.

The custom tour guide device 400, according to an embodiment of the present invention includes position identification module 410, either embedded in the device or included in a separate device. In an embodiment of the present invention, a gps receiver is used to locate the position of the user however, the position identification module 410 may equally use any other position identification devices or techniques. The position identification module 410 provides detailed coordinates of the user's location to a processor 420, in order to accurately represent the location on a display 430, e.g., on a displayed map.

A memory module 440 may include all of the maps needed for display on the display 430. The maps may be of a neighborhood, a city, a county, a region, a country or of the entire world. Multiple maps of differing scales and locations may also be stored. The memory 440 may also include a plurality of audio files, stored for example in mp3 format, although wave or any other audio format may be used. Each of the stored audio files may contain audio having a custom audio tour relating to a theme of interest to the user, and including information of interest to the user corresponding to a discrete position located on the map. For example, a preselected tour of Washington D.C. may have one or more audio files providing audio commentary regarding the history of Lafayette Park. The audio files may be linked to a discrete location on the map, e.g., the corner of H and $16^{th}$ Street, which borders the park. Thus, a user selecting the corner of H Street and $16^{th}$ Street on the map using the user input module 450, e.g., by pointing to the corner on the displayed map, may then hear the corresponding audio commentary regarding the history of the Park as played by the playback module 470.

Alternatively, a tracking module 460 may be used to automatically provide corresponding audio commentary. The tracking module 460 may receive coordinates of the user's location from the position identification module 410. The tracking module 460 may then correllate the user's current location with one or more saved map locations having corresponding audio commentary. For example, continuing the previous example regarding Lafayette Park, the position identification module 410 may report the location of the user as $17^{th}$ Street and H Street, as the user walks along H Street towards Lafayette Park. The tracking module 460 may then receive the user's location from the position identification module 410 and correllate the user's location to $16^{th}$ Street and H Street. The tracking module 460 may instruct the playback module 470 to automatically playback the audio commentary regarding the history of Lafayette Park and corresponding to the $16^{th}$ Street and H Street location. Consequently, the user need not manually select a particular point on the map to hear audio commentary. Similarly, a map of the area also need not be displayed to the user since the tracking module 460 provides for the automatic playback of audio commentary based on the location of the user.

The tracking module 460 may correllate the user's actual location to various locations having corresponding audio data using a variety of techniques. For example, the tracking module 460 may measure the distance between the position of the user as reported by the position identification module 410 and various locations having corresponding audio data, and may select the location nearest to the position of the user. One skilled in the art will recognize that a variety of other techniques may be used, including techniques taking into account the user's direction of movement, for example. Such a correllation may help prioritize file playback and help prevent the play back module 470 from attempting to simultaneously playback multiple files corresponding to a location situated near the user's location.

Figure 5:
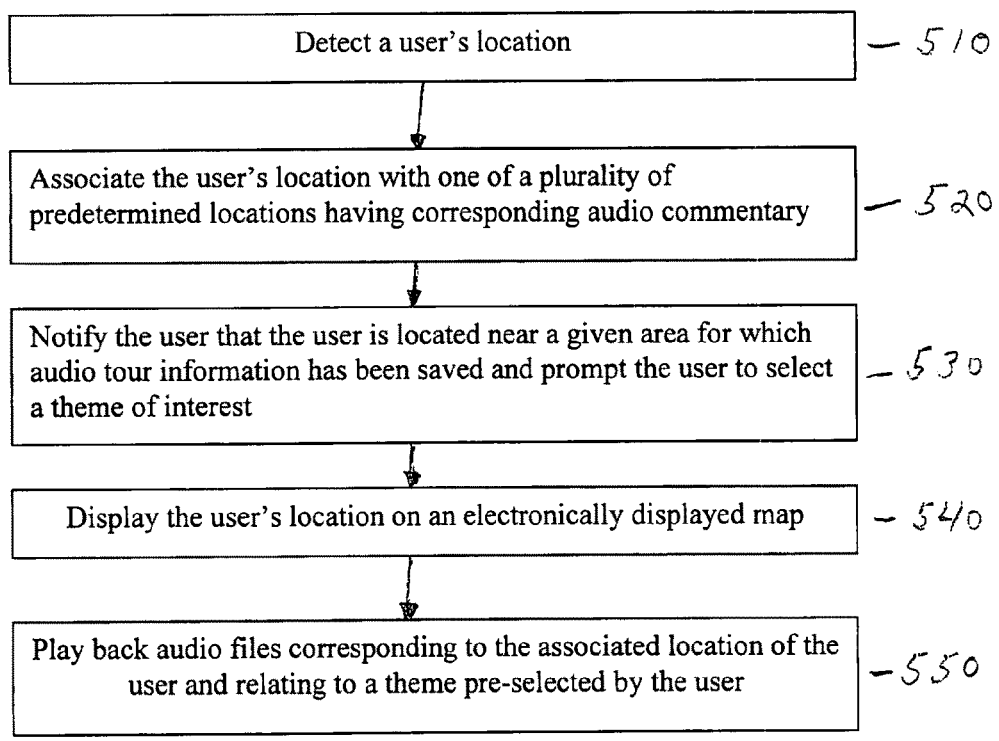
FIG. 5 illustrates a method of automatically providing customized tours, according to an embodiment of the present invention.

FIG. 5 illustrates a method of providing customized audio tours, according to an embodiment of the present invention.

In operation 510, a location of a user is detected, e.g., using a position identification device such as a gps.

In operation 520, the detected location of the user is associated with one of a plurality of predetermined locations having corresponding audio commentary with customized tour information relating to the predetermined locations.

In operation 530, the user may be notified that she is located near, or within range of, a given area for which audio tour information is saved. The user may then be prompted to select a theme of interest to the user. The theme relates to a customized audio tour to be provided, and may be selected from a plurality of themes of interest. The customized audio tour information may be included in audio files saved in memory of a portable device.

In operation 540, a location of the user may optionally be displayed on map, e.g., on a map displayed on a portable display device.

In operation 550, audio files including the audio commentary corresponding to the predetermined point associated with the user's position may be automatically played back to the user. The audio commentary relates to the theme selected by the user. One or more themes may be selected, therefore providing audio commentary to the user relating to multiple themes of interest to the user and corresponding to the current location of the user. The audio commentary includes customized tour information relating to the theme.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as media carrying or including carrier waves, as well as elements of the Internet, for example. Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A portable electronic device providing customized audio tours, the device comprising:
    a display to display a map;
    a user input module to allow a user to select a particular point of the map displayed on the display and to allow a user to select a first theme of a plurality of themes and a second theme of the plurality of themes; and
    a playback module to consecutively play a first audio file corresponding to the first theme of the plurality of themes and a second audio file corresponding to the second theme of the plurality of themes, wherein each of the played audio files is selected from a plurality of audio files stored in the portable device and includes information regarding an area of the map corresponding to the particular point selected.

2. The device in claim 1, further comprising a position identification module detecting a location of the user carrying the portable electronic device and displaying the detected location of the user on the map.

3. The device in claim 2, wherein the position identification module comprises a global positioning system (gps) receiver.

4. The device in claim 1, further comprising a memory storing the plurality of audio files, wherein each of the plurality of audio files has information of interest to the user related to a point located within the displayed.

5. The device in claim 1, further comprising a memory storing the plurality of audio files, each audio file having information of interest to the user corresponding to a particular theme, and wherein the audio files are organized in memory according to theme.

6. The device in claim 5, wherein when the user selects the particular point of the map, the first audio file and the second audio file are consecutively played, whereby a narrative providing information of interest corresponding to the selected first theme and second theme is played.

7. The device in claim 1, wherein the user input module allows the user to select for playback audio files corresponding to the particular point of the map displayed on the display by touching the screen.

8. The device in claim 1, wherein the plurality of stored audio files are compressed audio files.

9. The device in claim 1, wherein the plurality of stored audio files are categorized in memory according to the plurality of themes.

10. A method of providing customized audio tours, the method comprising:
    displaying a map;
    receiving a particular point of the displayed map as an input according to a selection of a user;
    receiving a first theme and a second theme, each selected by the user from a plurality of themes; and
    consecutively playing a first audio file corresponding to the first theme of the plurality of themes and a second audio file corresponding to the second theme of the plurality of themes, wherein each of the played audio files is selected from a plurality of audio files stored in the portable device and includes information regarding an area of the map corresponding to the particular point selected.

11. The method in claim 10, further comprising detecting a location of the user and displaying the detected location of the user on the map.

12. The method in claim 10, further comprising storing a plurality of audio files having information of interest to the user, wherein each of the audio files are categorized according to a particular theme and each of the audio files corresponds to a particular location.

13. The method in claim 12, wherein when the selection of the particular point of the map is received from the user, the first audio file and the second audio file are consecutively played, whereby a narrative providing information of interest corresponding to the selected first theme and second theme is played.

14. The method in claim 10, wherein the particular point of the map is received as an input when the particular point is touched on a display displaying the map.

15. At least one non-transitory computer-readable medium comprising computer readable code to control at least one processing element in a computer to implement the method of claim 10.

16. A portable electronic device providing customized audio tours, the device comprising:
a position identification module to detect a location of a user carrying the portable electronic device;
a tracking module to associate the detected location of the user with one of a plurality of predetermined locations;
a user input module to allow the user to select a first theme of a plurality of themes and a second theme of the plurality of themes;
a memory to store a plurality of audio files, each of the audio files being associated with one of the plurality of predetermined locations, and the each of the audio files having particular information of interest to the user regarding the associated predetermined location; and
a playback module to consecutively play back a first audio file corresponding to the first theme of the plurality of themes and a second audio file corresponding to the second theme of the plurality of themes when the tracking module associates the detected location of the user with the predetermined location.

17. The device in claim 16, wherein the user input module allows the user to select a particular point of a map displayed on a display of the portable electronic device by touching the display.

18. The device in claim 16, wherein the position identification module automatically notifies the user that the user is in range of one of the plurality of predetermined locations having the associated audio files.

19. A portable electronic device providing customized audio tours, the device comprising:
a position identification module to detect a location of a user carrying the portable electronic device;
a display to display a map of an area including the detected location of the user;
a user input module to allow the user to select a first theme of a plurality of themes and a second theme of the plurality of themes;
a memory storing a plurality of audio files, each file having information of interest to the user related to a point located within the area found on the map and corresponding to one of the plurality of themes; and
a playback module to consecutively play back a first audio file corresponding to the first theme of the plurality of themes and a second audio file corresponding to the second theme of the plurality of themes, wherein each of the audio files is related to the point located within the area found on the map corresponding to the detected location of the user.

20. A portable electronic device providing customized audio tours, the device comprising:
a position identification module detecting a location of a user carrying the portable electronic device;
a display displaying a map including the detected location of the user;
a user input module allowing a user to select a first theme of a plurality of themes and a second theme of the plurality of themes;
a playback module consecutively playing a first audio file corresponding to the first theme of the plurality of themes and a second audio file corresponding to the second theme of the plurality of themes, wherein each of the audio files includes custom information regarding an area of the map corresponding to the detected location of the user and is selected from a plurality of audio files stored in the portable device.

* * * * *